United States Patent
Nishino et al.

(10) Patent No.: US 7,464,560 B2
(45) Date of Patent: Dec. 16, 2008

(54) AIR CONDITIONER FOR AUTOMOBILE

(75) Inventors: Tatsuhiko Nishino, Kariya (JP); Eiichi Torigoe, Anjo (JP)

(73) Assignee: Denso Corporation, Kariya (JP)

( * ) Notice: Subject to any disclaimer, the term of this patent is extended or adjusted under 35 U.S.C. 154(b) by 495 days.

(21) Appl. No.: 11/071,902

(22) Filed: Mar. 2, 2005

(65) Prior Publication Data

US 2005/0193751 A1    Sep. 8, 2005

(30) Foreign Application Priority Data

Mar. 3, 2004  (JP) ............................. 2004-059526
Mar. 3, 2004  (JP) ............................. 2004-059527

(51) Int. Cl.
*F25B 41/00*   (2006.01)
*F25D 17/00*   (2006.01)
*H05B 3/10*    (2006.01)

(52) U.S. Cl. .................... 62/173; 62/178; 236/49.1; 219/208; 219/543; 219/546

(58) Field of Classification Search ............... 236/49.1, 236/49.3; 62/178, 180, 173; 219/202, 208, 219/542, 543, 546
See application file for complete search history.

(56) References Cited

U.S. PATENT DOCUMENTS 5,206,476 A * 4/1993 Fresch et al. ............... 219/202
5,415,133 A * 5/1995 Noh .......................... 122/13.01
6,002,105 A * 12/1999 Tamada ....................... 219/202

FOREIGN PATENT DOCUMENTS

| JP | 51-133305  | 10/1976 |
| JP | 52-119546  | 10/1977 |
| JP | 56-034512  | 4/1981  |
| JP | 60008110   | 1/1985  |
| JP | 63-203411  | 8/1988  |
| JP | 04-321895  | 11/1992 |

(Continued)

OTHER PUBLICATIONS

Office Action dated Feb. 8, 2008 in corresponding JP Application No. 2004-059526 with English translation.

(Continued)

*Primary Examiner*—Marc E Norman
(74) *Attorney, Agent, or Firm*—Harness, Dickey & Pierce, PLC

(57) ABSTRACT

A flow passage through which a heat exchange medium flows is formed at least at a part of each airflow duct 3 to 6, and the heat exchange medium flowing through the passage (t) is allowed to cool or heat air flowing through the airflow duct 3 to 6. Alternatively, a heat generation film H is formed at a part of an inner surface of an air passage of each airflow duct 3 to 6 and is allowed to heat air flowing through the airflow duct 3 to 6. Because the airflow ducts 3 to 6 per se are first cooled or heated by the heat exchange medium flowing through the passage (t), the heat exchange loss with the airflow ducts, that has occurred in the prior art, can be eliminated. Because air conditioning wind is cooled or heated inside the airflow ducts 3 to 6, too, instantaneous cooling/warming performance can be improved.

5 Claims, 10 Drawing Sheets

FOREIGN PATENT DOCUMENTS

| | | |
|---|---|---|
| JP | 6-8015 | 2/1994 |
| JP | 06-46244 | 6/1994 |
| JP | 08-025947 | 1/1996 |
| JP | 10-119545 | 5/1998 |
| JP | 2002-348942 | 12/2002 |
| JP | 2003-211935 | 7/2003 |

OTHER PUBLICATIONS

Office Action dated Feb. 8, 2008 in corresponding JP Application No. 2004-059527 with English translation.

Office action dated Jul. 29, 2008 in Japanese Application No. 2004-059526 with English translation thereof.

\* cited by examiner

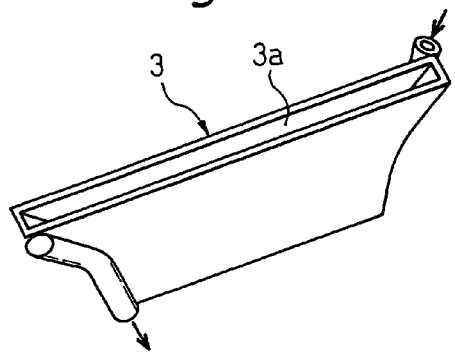
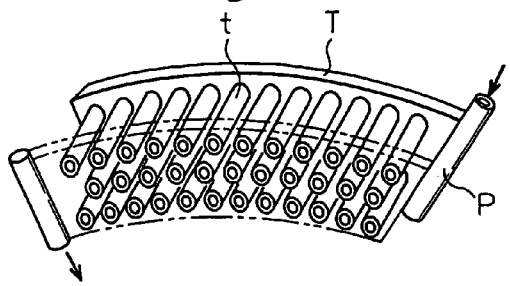
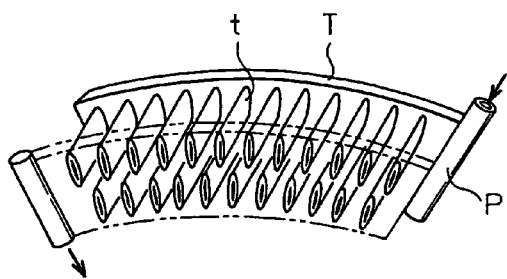
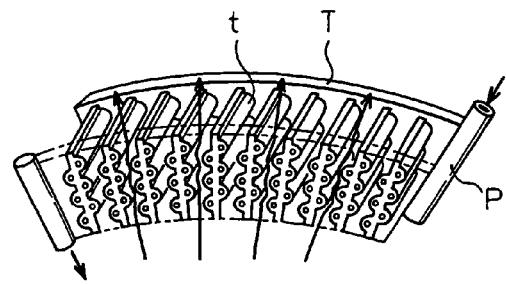
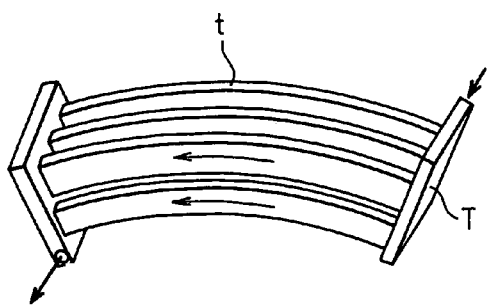
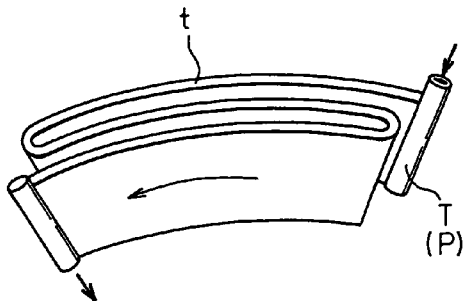

AIR CONDITIONER FOR AUTOMOBILE

BACKGROUND OF THE INVENTION

1. Field of the Invention

This invention relates to an air conditioner for an automobile. More particularly, the invention relates to an improvement in an instantaneous cooling or warming performance.

2. Description of the Related Art

The temperature inside a passenger compartment of an automobile rises while the car is parked, in summer, due to solar radiation. The need for instantaneous cooling inside the passenger compartment is high under such a condition. In existing automobile air conditioners, airflow ducts for distributing air-conditioning air are fitted to an interior air conditioner unit and cooling air is sent to each blow-out port, inside the passenger compartment, such as a defroster blow-out port, a face blow-out port, a foot blow-out port, and so forth, and the temperature of each airflow duct rises during parking in summer. Therefore, the cooling air receives heat, for the airflow ducts that are heated, and is heated even when instantaneous cooling is desired. The instantaneous cooling performance is thus deteriorated.

The temperature inside the passenger compartment drops due to the cold external air, while the car is parked, in winter. Under such conditions, the cooling water of an automobile engine is not sufficiently heated for several minutes at the starting of the automobile and a hot water system heater using this cooling water as a heat source fails to provide a feeling of warmth. Another problem is that demisting and defrosting of a front windshield and side window glass cannot be done because hot air is not blown out. Furthermore, it has become more difficult to secure sufficient warming calorific power, from engine cooling water alone, as the efficiency of the automobile engines has become higher in recent years.

Under the circumstances described above, the need for instantaneous warming inside the passenger compartment is high. In existing automobile air conditioners, airflow ducts for distributing air-conditioning air are fitted to the interior air conditioner unit and cooling air is sent to each blow-out port, inside the passenger compartment, such as the defroster blow-out port, the face blow-out port, the foot blow-out port, and so forth. Japanese Unexamined Patent Publications No. 60-8110 and No. 6-8015 can be cited as prior art references relating to instantaneous warming. The former disposes an electric heater inside the blow-out port arranged in an automobile door and the latter disposes an electric heater inside a branch duct branching from a main duct.

The temperature of the airflow duct greatly drops due to an external air temperature during parking in winter. Therefore, according to the prior art technologies described above, the hot air loses heat to the cold airflow ducts and is cooled even when instantaneous warming is desired, with the result being a deterioration in the instantaneous warming performance. Because the electric heater must be arranged in these technologies, the problems of space, an increase of the production cost and an increase in the weight, occur. In addition, the electric heater is operated only for instantaneous warming, and the airflow resistance inside the airflow duct increases at other times.

SUMMARY OF THE INVENTION

The invention was completed in view of the problems of the prior art technologies described above and aims at providing an air conditioner for an automobile that eliminates the heat exchange loss with the airflow ducts and improves an instantaneous cooling/warming performance by conducting cooling and heating inside the airflow ducts.

According to one aspect of the invention, there is provided an air conditioner, for an automobile, which includes an interior air conditioner unit (1) for forming an air passage; a blower (2) for introducing air inside and outside a passenger compartment and blowing air into the interior air conditioner unit (1); heat exchangers (10, 25) disposed inside the interior air conditioner unit (1), for exchanging heat with the air; opening portions (28 to 30) of the interior air conditioner unit (1) for blowing out heat-exchanged air; blow-out ports (3a to 6a) disposed inside the passenger compartment, for blowing out heat-exchanged air; and airflow ducts (3 to 6) for connecting and communicating the opening portions (28 to 30) and the blow-out ports (3a to 6a); wherein a passage (t) through which a heat exchange medium flows is formed at least at a part of the airflow ducts (3 to 6), and the heat exchange medium flowing through the passage (t) cools or heats air flowing inside the airflow ducts (3 to 6).

According to this invention, the airflow ducts (3 to 6) per se are first cooled or heated by the heat exchange medium flowing through the passage (t). Consequently, the heat loss to the airflow ducts that has occurred in the prior art technologies can be eliminated. Because air-conditioning air is cooled or heated inside the airflow ducts (3 to 6), the instantaneous cooling/warming performance can be improved. Because the air-conditioning air is cooled or heated inside the airflow ducts (3 to 6), too, the size of heat exchangers (10, 25) for cooling and for heating inside the interior air conditioner unit (1) can be reduced and the entire interior air conditioner unit (1) can be made compact.

In the invention, the passage (t) is disposed inside the air passage of the airflow ducts (3 to 6) or in a wall portion forming the air passage. Consequently, air flowing inside the airflow ducts (3 to 6) can be cooled or heated.

In the invention, the passage (t) is disposed at a center or at a position inside and close to the air passage in a direction of thickness of the wall portion. Consequently, it becomes possible to suppress unnecessary cooling or heating of air outside the airflow ducts (3 to 6) and to effectively cool or heat air flowing inside the airflow ducts (3 to 6).

In the invention, the passage (t) is formed integrally with the wall portion. Therefore, the airflow ducts (3 to 6) having the heat exchange function can be constituted compactly and an increase in the cost of production can be suppressed.

In the invention, protuberance portions, for increasing a heat exchange area, are formed inside the air passage. In the invention, partition portions for increasing the heat exchange area are formed inside the air passage. Both of these constructions can improve the heat exchange efficiency.

In the invention, the passage (t) is formed inside the protuberance portions or the partition portions, too. Therefore, the heat exchange efficiency can be further improved.

In the invention, a heat exchange medium is cooled by a refrigerant evaporator (10) of a refrigeration cycle (R). In the invention, further, cooling water of an engine (11) is used for the heat exchange medium. According to this construction, cooling and heating can be done in the airflow ducts (3 to 6) by using the same construction as that of the car air conditioners of the prior art without adding any specific cooling/heating means for the heat exchange medium.

In the invention, passage switching means (15, 16) controlled by air conditioner control means (17) switch a cooling passage through which the heat exchange medium flowing through the passage (t) circulates to the refrigerant evaporator (10) and a heating passage through which the heat exchange medium circulates to the engine (11). Cooling and heating, in the airflow ducts (3 to 6) having the heat exchange function, can be operated for cooling in summer and for engine starting in winter, in an interlocking arrangement of mode switching, by the interior air conditioner unit (1).

According to another aspect of the invention, there is provided an air conditioner for cars including an interior air conditioner unit (1) for forming an air passage; a blower (2) for introducing air inside and outside a passenger compartment and blowing air into the interior air conditioner unit (1);

heat exchangers (10, 25) disposed inside the interior air conditioner unit (1), for exchanging heat with air;

opening portions (28 to 30) of the interior air conditioner unit (1) for blowing out heat-exchanged air;

blow-out ports (3a to 6a) disposed inside the passenger compartment, for blowing out heat-exchanged air; and airflow ducts (3 to 6) for connecting and communicating the opening portions (28 to 30) and the blow-out ports (3a to 6a); wherein a heat generation film (H) is formed on at least a part of an inner surface of the air passage of the airflow ducts (3 to 6) and heats the air flowing inside the airflow ducts.

In the invention, the heat generation film (H) is applied inside the airflow ducts (3 to 6), is heated by feeding electric power and is used as a heat source for instantaneous warming. According to the invention described above, a feeling of warmth can be acquired before cooling water of the car engine is heated (instantaneous warming), and demisting and defrosting of the front wind shield and side window glass can be instantaneously started.

Even when the airflow ducts (3 to 6) are cooled at this time, the heat loss, in that hot air exchanges heat with its blast ducts (3 to 6) and is cooled, can be eliminated. Air can be heated inside the blast ducts (3 to 6) to cope with an insufficiency of the heat source resulting from higher efficiency of the automobile engine. Therefore, a warming performance can be improved by this auxiliary heat source. Furthermore, the size of the heat exchanger (25) for heating inside the interior air conditioner unit (1) can be reduced and the scale of the entire interior air conditioning unit (1) can be made compact.

In this invention, a net-like member (N) covered with the heat generation film (H) is disposed inside the air passage. Consequently, air flowing through the airflow ducts (3 to 6) can be heated.

In the invention, protuberance portions for increasing a heat exchange area are formed inside the air passage, and the heat generation film (H) is disposed on an outer surface of the protuberance portions. Alternatively, partition portions for increasing the heat exchange area are formed inside the air passage, and the heat generation film (H) is disposed on both surfaces of the partition portions, too. In the invention, the protuberance portions or the partition portions are formed or arranged in such a manner that air flows in a zigzag manner through them. Any of these inventions can improve the heat exchange efficiency.

In the invention, a passage (t) through which the heat exchange medium flows is disposed inside, and at a part of, any of wall portions forming the air passage, the protuberance portions and the partition portions, and the heat exchange medium flowing through the passage (t) heats air flowing through the airflow ducts. According to this invention, the heat exchange medium flowing through the passage (t) heats air flowing inside the airflow ducts (3 to 6), too. Therefore, the instantaneous warming performance can be further improved. Incidentally, the reference numerals of each means inside the parenthesis represents an example of correspondence to concrete means described in later-appearing embodiments.

The present invention may be more fully understood from the description of preferred embodiments of the invention, as set forth below, together with the accompanying drawings.

BRIEF DESCRIPTION OF THE DRAWINGS

In the drawings:

FIGS. 4A to 4F show examples where the invention is applied to a defroster duct 3, wherein FIG. 4A is an appearance perspective view of the defroster blast duct 3 and FIGS. 4B to 4F are perspective views each showing a structural example of passages t formed inside the airflow duct 3;

FIGS. 5A to 5G show examples where the invention is applied to a side face blast duct 5, wherein FIG. 5A is an appearance perspective view of a side face blow-off duct 5(L) and FIGS. 5B to 5G are sectional perspective views each showing a structural example of passages t formed inside the airflow duct 5 in a section V-V;

FIGS. 9A to 9E show examples of the second embodiment where the invention is applied to a defroster airflow duct 3, wherein FIG. 9A is an appearance perspective view of the defroster airflow duct 3 and FIGS. 9B to 9E are perspective views each showing a structural example of protuberance portions and partition portions formed inside the blast duct 3;

FIGS. 10A to 10E show examples of the second embodiment where the invention is applied to a side face airflow duct 5, wherein FIG. 10A is an appearance perspective view of the side face airflow duct 5(L) and FIGS. 10B to 10E are sectional perspective views each showing the blast duct 5 in a section X-X;

FIGS. 11A to 11F show examples of a third embodiment where the invention is applied to a defroster airflow duct 3, wherein FIG. 11A is an appearance perspective view of the defroster airflow duct 3 and FIGS. 11B to 11F are sectional perspective views each showing a structural example of passages t formed inside the blast duct 3; and FIGS. 12A to 12G show examples of the third embodiment where the invention is applied to a side face airflow duct 5, wherein FIG. 12A is an appearance perspective view of a side face blow-out duct 5(L) and FIGS. 12B to 12GE are sectional perspective views each showing the passages t formed inside airflow duct 5 in a section XII-XII.

DESCRIPTION OF THE PREFERRED EMBODIMENTS

First Embodiment

Figure 1:
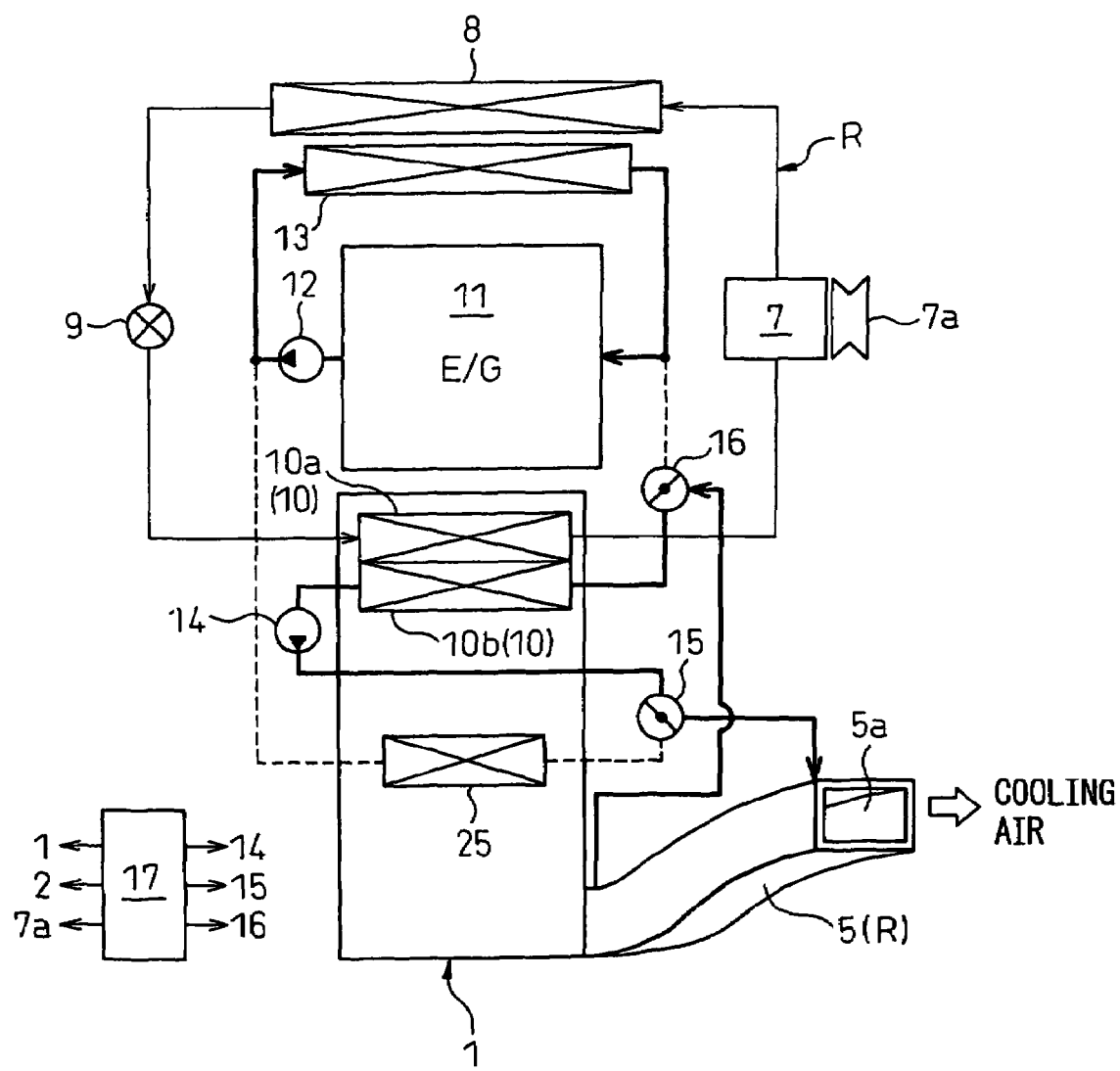
FIG. 1 is a schematic view showing an overall construction of an air conditioner for an automobile according to a first embodiment of the invention.

Preferred embodiments of the invention will be hereinafter explained in detail with reference to the accompanying drawings. FIG. 1 is a schematic view showing an overall construction of an air conditioner for an automobile according to the first embodiment of the invention and showing a condition at the time of cooling.

A refrigeration cycle R of the air conditioner for an automobile includes a compressor (coolant compressor) 7 for sucking, compressing and discharging a refrigerant. The compressor 7 has an electromagnetic clutch 7a for connecting and disconnecting power. Power from an automobile engine 11 for driving the car is transmitted through the electromagnetic clutch 7a and through a belt, not shown, and drives the compressor 7. The operation of the compressor 7 is connected and disconnected by an air condition controller 17 constituting control means for air conditioning, which connects and disconnects the feed of electric power to the electromagnetic clutch 7a.

A super-heated gaseous refrigerant at a high temperature and a high pressure, discharged from the compressor 7, flows into a condenser 8 constituting a refrigerant condenser and is cooled and condensed while exchanging heat with external air blasted from a cooling fan, not shown. The pressure of the condensed refrigerant from this condenser 8 after gas/liquid separation is reduced to a low pressure by an expansion valve 9 constituting pressure reducing means through a receiver, not shown, constituting a liquid receiving device for collecting and discharging the liquid refrigerant. In consequence, the refrigerant turns to the low pressure gas/liquid two-phase state. The expansion valve 9 is a temperature system expansion valve that regulates the degree of opening of the valve (refrigerant flow rate) in such a manner as to regulate the degree of super-heating of the refrigerant at the outlet of an evaporator 10 constituting the refrigerant evaporator.

Figure 2:
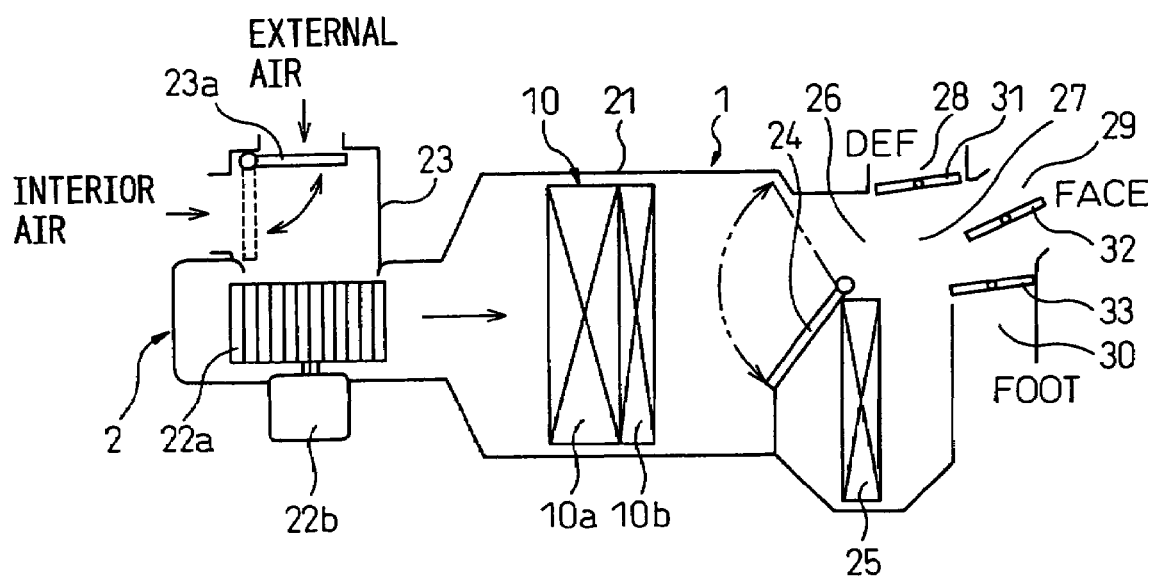
FIG. 2 is a schematic view showing a schematic construction of an interior air conditioner unit 1 inside a passenger compartment shown in FIG. 1.

The evaporator 10 of a heat exchanger for cooling evaporates the low pressure refrigerant, the pressure of which is reduced by the expansion valve 9, and cools the air flow into the passenger compartment. FIG. 2 is a schematic view useful for explaining a schematic structure of the interior air conditioner unit shown in FIG. 1. The interior air conditioner unit 1 is ordinarily mounted into an instrumental panel at the front part of the passenger compartment.

An air conditioner case 21 of the interior air conditioner unit 1 constitutes the passage of air blasted into the passenger compartment. The evaporator 10 is installed inside this air conditioner case 21. Incidentally, a brine cooling portion 10b, for cooling engine cooling water and constituting a later-appearing heat exchange medium, is integrated with, and adjacent to, an air cooling portion 10a for evaporating the low pressure refrigerant on the air flow downstream side of the air cooling portion 10a in the evaporator 10 according to the invention.

In the air conditioner case 21, the blower 2 is arranged on the upstream side of the evaporator 10. The blower 2 has a centrifugal type blower fan 22a and a driving motor 22b. An interior/exterior air switch box 23 is arranged on the suction side of the blower fan 22a. An interior/exterior switch door 23a inside the interior/exterior air switch box 23 switches and introduces external air (air outside the passenger compartment) and interior air (air inside the passenger compartment). An air mixing door 24 is arranged on the downstream side of the evaporator 10 inside the air conditioner case 21, and a heater core 25 arranged as a heat exchanger for heating, that heats air with cooling water (hot water) of the automobile engine 11 as a heat source, is installed on the downstream side of the air mixing door 24.

A bypass passage 26 for causing air (cold air) to flow while bypassing the heater core 25 is formed on the side (at the upper part) of the heater core 25. The air mixing door 24 is a sheet-like door capable of rotating and regulates the proportion of the air flow of hot air passing through the heater core 25 and the air flow of cold air passing through the bypass passage 26. Therefore, the air mixing door 24 constitutes temperature adjustment means for air blown into the passenger compartment. Air having a desired temperature can thus be generated by mixing hot air from the heater core 25 and cold air from the bypass passage 26 by an air mixing portion 27.

A blow mode switch portion is formed on the downstream side of the air mixing portion 27 inside the air conditioner case 21. In other words, blow mode doors 31 to 33 open and close a defroster opening portion 28 for blowing out air into the inner surface of a front window shield of the car, a face opening portion 29 for blowing out air into the upper half of a passenger inside the passenger compartment and a foot opening portion 30 for blowing out air into the feet of the passenger.

Figure 3:
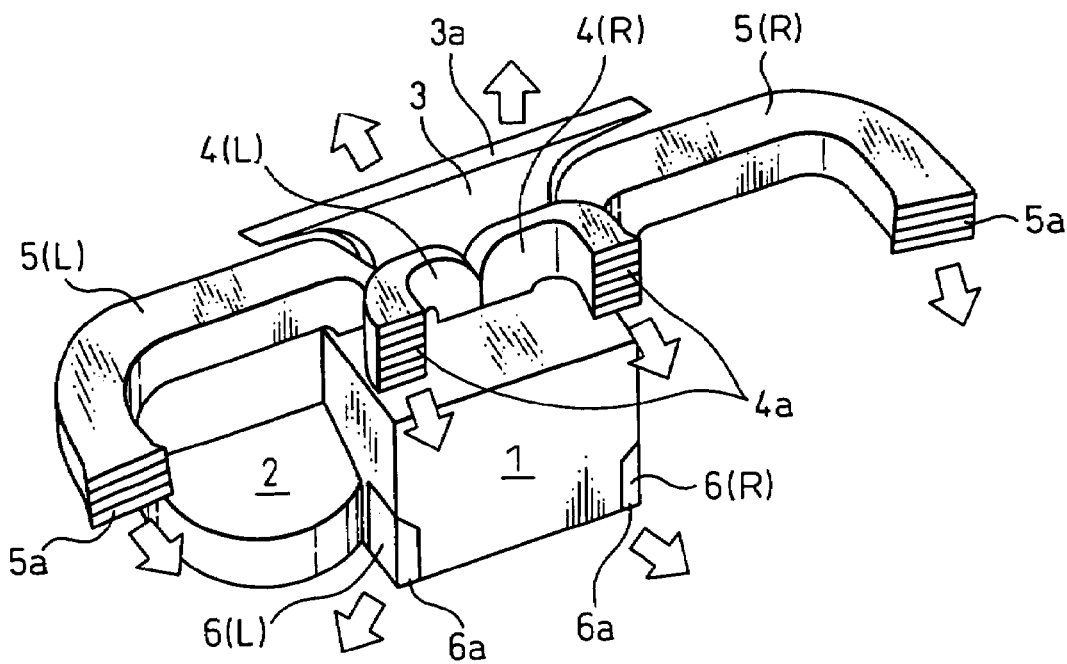
FIG. 3 is a perspective view showing the state where each of airflow ducts 3 to 6 is fitted to the interior air conditioner unit 1 shown in FIG. 2.

FIG. 3 is a perspective view showing the state where each of the blast ducts 3 to 6 according to the embodiment is fitted to the interior air conditioner unit 1 shown in FIG. 2. The opening portions 28 to 30 of the interior air conditioner unit 1 and the blow-out ports 3a to 6a disposed inside the passenger compartment are communicated with one another through the airflow ducts 3 to 6 as the gist of the invention. More concretely, the defroster opening portion 28 is connected to the defroster blow-out port 3a through the defroster airflow duct 3 and blows air to the inner surface of the front window shield of the automobile from the defroster blow-out port 3a.

The face opening portion 29 is further divided into a center face opening portion and a side face opening portion and each of them is divided into a right side opening portion (R: for driver's seat) and a left side opening portion (L: for passenger's seat). The center face opening portion is connected to a center face blow-out port 4a arranged above the center of the instrumental panel in the transverse direction through the center face blow-out duct 4 and air is blasted from the blow-out port towards the face of the passenger at the center of the passenger compartment.

The side face opening portion is connected to side face blow-off ports 5a arranged at the upper part of both end portions of the instrumental panel through the side face airflow duct 5. Each side face blow-out port 5a has a known wind direction changing device that is operated manually. Blow-out air can be blown out to the passenger face portions on both right and left sides inside the passenger compartment or towards the front window shield when an air direction plate of the air direction changing device is operated. The foot opening portion 30 is divided into the right side opening portion (R: for driver's seat) and to the left side opening portion (L: for passenger's seat), too. These opening portions are connected to the foot blow-out ports 6a through the foot duct 6 and blow hot air to the feet of the right and left passengers from these blow-out ports.

Next, the explanation will be given regarding a brine (heat exchange medium) circuit for supplying cold water and hot water to the airflow ducts 3 to 6 having the heat exchanging function in the invention. Incidentally, this embodiment uses cooling water of the automobile engine 11 as the brine in order to use in common the heat source together with the heater core 25.

During the cooling shown in FIG. 1, cooling water cooled by the brine cooling portion 10b of the evaporator 10 is pressure fed by a brine pump 14 and is sent from a three-way valve 15, constituting flow passage changing means, to the airflow duct 5 having the heat exchange function of the invention (typified by the side face airflow duct 5 in FIG. 1 and later-appearing FIG. 6). After cooling the air-conditioning air flowing inside through a later-appearing passage of the airflow duct 5 having the heat exchange function, cooling water returns from a three-way valve 16 constituting another passage changing means to the brine cooling portion 10b of the evaporator 10 and repeats this circulation.

On the other hand, cooling water of the engine 11 is made to circulate by a cooling water pump 12 integrated with the automobile engine 11 between a radiator 13 arranged on the air flow downstream side of the condenser 8 and the automobile engine 11. The radiator 13 conducts heat exchange with external air from the cooling fan, not shown, with the condenser 8 and is cooled. The air conditioner includes, in practice, a thermostat and bypass passages for bypassing cooling water from the radiator 13 when the cooling water temperature is below a predetermined temperature but they are omitted here.

Figure 6:
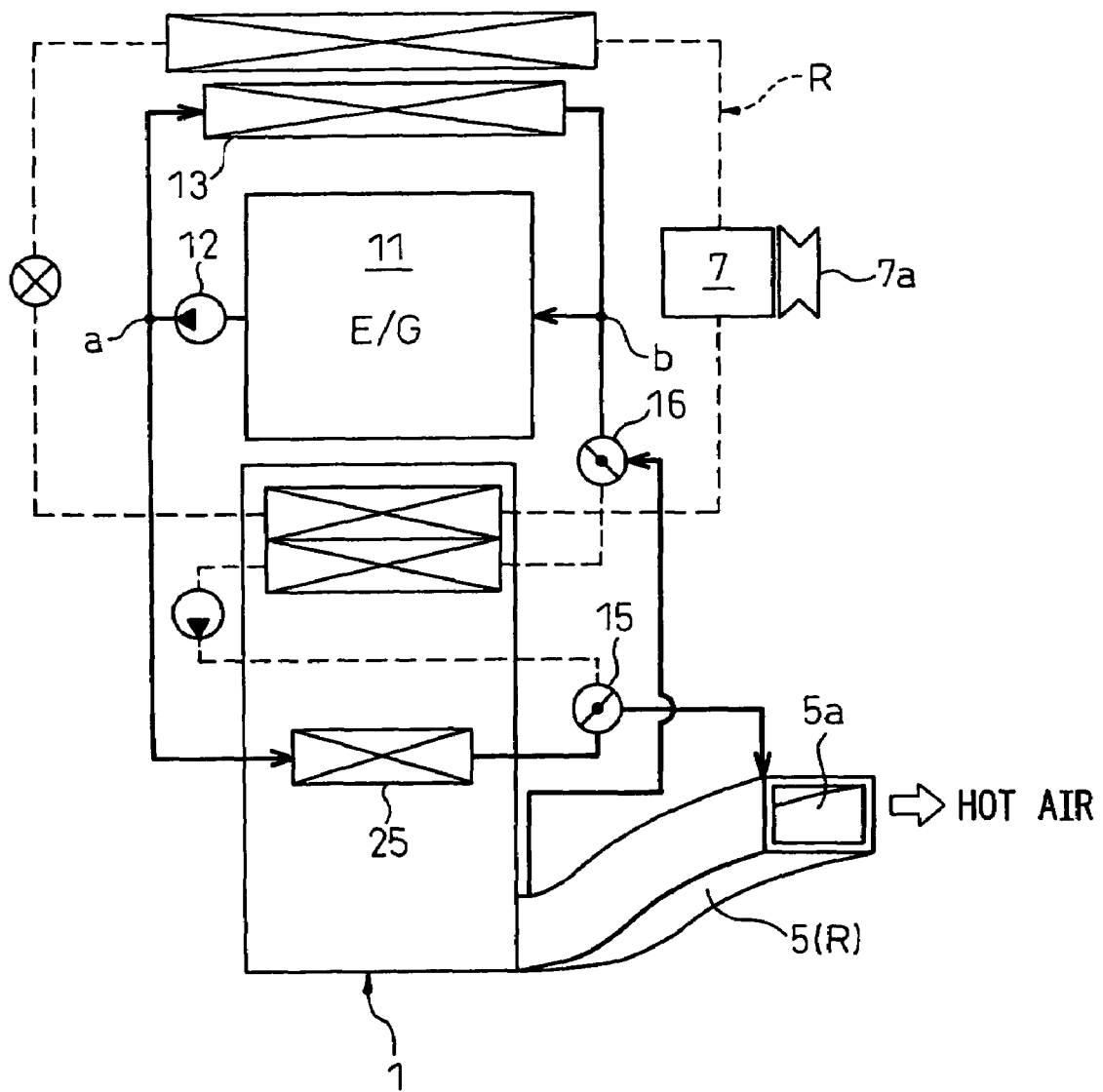
FIG. 6 shows a condition of warming in the same schematic view as FIG. 1.

FIG. 6 shows the condition of warming in the same way as the schematic view of FIG. 1. When the three-way valves 15 and 16 are switched to the heating side, cooling water pressure fed by the cooling water pump 12 flows from a branch point (a) towards the heater core 25 and is further sent from the three-way valve 15 to the duct 5 having the heat exchange function according to the invention. After heating the air-conditioning air flowing inside, through a later-appearing passage, of the airflow duct 5 having the heat exchange function, cooling water returns to the automobile engine 11 from the three-way valve 16 constituting another passage changing means through a branch point (b) and repeats the circulation.

Signals are inputted from various sensors, not shown, to the air conditioning controller 17 in the air conditioner for an automobile having the construction described above and control signals are sent from the air conditioning controller 17 to the interior air conditioner unit 1, the blower 2, the electromagnetic clutch 7a, the brine pump 14 and the three-way valves 15 and 16 to control the operation.

Next, the construction of the airflow duct having the heat exchange function as the gist of the invention will be explained. FIGS. 4A to 4F show the example where the invention is applied to the defroster airflow duct 3. FIG. 4A is perspective view of the defroster airflow duct 3. FIG. 4B is a perspective view showing a structural example of the passages (t) formed inside the airflow duct 3. The airflow duct of the invention is formed of a synthetic resin material and the passages (t) through which the brine flows are integrally formed. Incidentally, each passage (t) may be integrally formed of the resin or may integrally be formed by insert molding by use of flat tubes of metal.

FIG. 4A shows an example of a wide and short duct such as the defroster duct 3. In FIG. 4B, a header tank portion T is formed inside both wide wall portions forming the air passages of the airflow duct 3 and a large number of tubes (t) communicating the head tank T are arranged inside the air passages to establish a heat exchange with the air. Incidentally, symbol P in the drawing represents a header pipe for supplying the brine to the header tank portion T and recovering the brine, after heat exchange, from the header tank portion T.

Incidentally, the tube (t) in FIG. 4B is a round tube but it may be a flat tube as shown in FIG. 4C. Alternatively, concavo-convexities may be disposed on both flat surfaces of the flat tube to form air flow passages so that air flows in a zigzag manner between them, as shown in FIG. 4D. The flat tubes may be arranged in the longitudinal direction inside the air passages as shown in FIG. 4E or a type obtained by folding a flat tube as shown in FIG. 4F may be used, too.

Figure 5A:
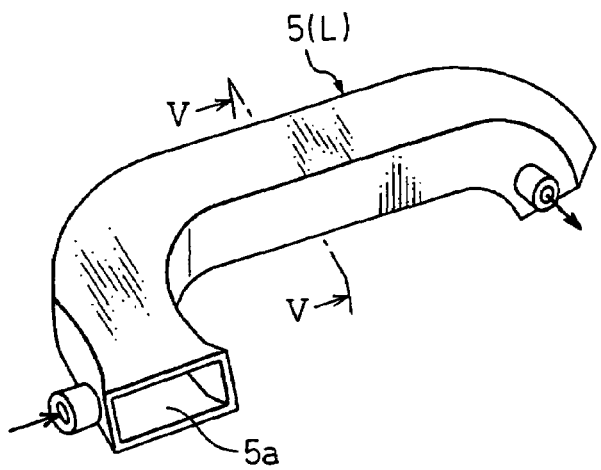
Figure 5B:
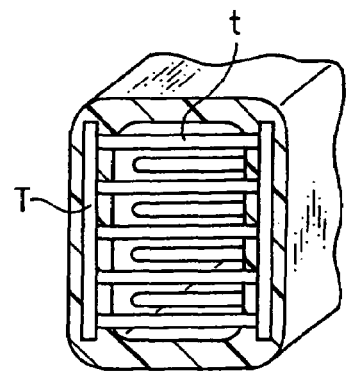

FIGS. 5A to 5G show examples where the invention is applied to the side face airflow duct 5. FIG. 5A is an appearance perspective view of the side face blow-off duct 5(L) and FIGS. 5B to 5G are sectional perspective views each showing a structural example of passages (t) formed inside the airflow duct 5 in a V-V section. Referring to FIG. 5B, header tank portions T are formed inside wall portions opposing one another and forming the air passages of the airflow duct 5 in the thinly elongated duct such as the side face airflow duct 5 and a large number of tubes communicating between the header tank portions T are arranged inside the air passages to establish heat exchange with the flowing air.

Figure 5C:
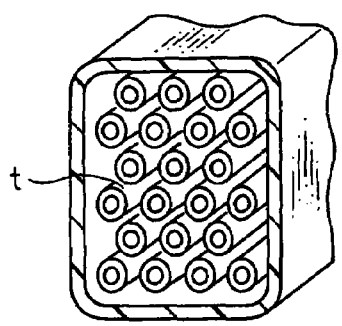
Figure 5D:
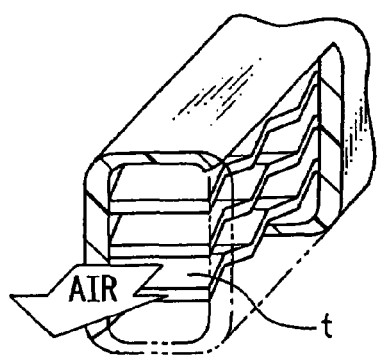

Incidentally, the tubes (t) in FIG. 5B are arranged in the direction intersecting the air passages but may be arranged in the direction of the air passages as shown in FIG. 5C or flat tubes may be used in place of the round tubes as shown in FIG. 5D. The brine flowing direction inside the flat tubes may be the direction intersecting the air passage or a direction opposing flowing air.

Figure 5E:
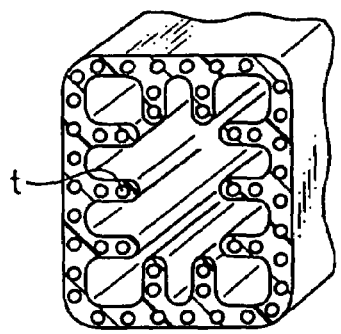
Figure 5F:
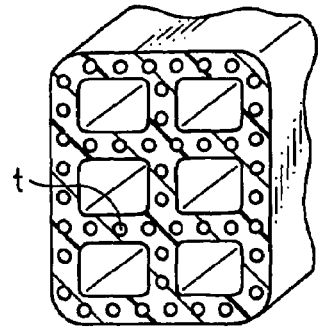
Figure 5G:
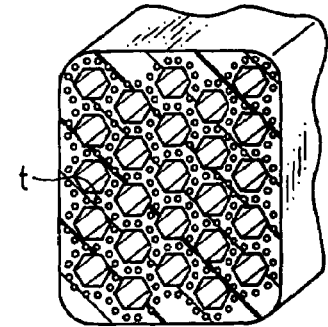

Heat medium flow holes (passages) (t) may be integrally formed inside the walls forming the air passages as shown in FIGS. 5E to 5G or protuberance portions may be disposed inside the air passages to increase the heat exchange area as shown in FIG. 5E or partition portions may be disposed as shown in FIGS. 5F and 5G. Furthermore, the heat medium passage holes (t) may be formed in the protuberance portions or in the partition portions. The partition shape of the air passages may be grid-like as shown in FIG. 5F or honeycomb-like as shown in FIG. 5G and is not particularly limited. Similar constructions may be employed, whenever necessary, for the center face airflow duct and for the foot airflow duct 6 that have not been explained.

Next, the outline of the operation of the air conditioner for automobile having the construction described above will be explained with reference to FIGS. 1 and 6.

For cooling (see FIG. 1):

The electromagnetic clutch 7a is connected to drive the compressor 7 and to circulate the refrigeration cycle R. After the air cooling portion 10a of the evaporator 10 cools the air, the brine cooling portion 15b cools the brine (engine cooling water). The three-way valves 15 and 16 are switched to the cooling circuit side shown in FIG. 1 and the brine pump 14 is operated.

Consequently, cooling water cooled by the brine cooling portion 10b of the evaporator 10 is pressure fed by the brine pump 14 from the three-way valve 15 constituting the passage switching means to each airflow duct (indicated by reference numeral 5 in FIG. 1) with the heat exchange function of the invention. After air-conditioning air flowing through the passages (t) inside each airflow duct having the heat exchange function is cooled, it returns to the brine cooling portion 10b of the evaporator 10 from the three-way valve 16 constituting another passage switching means, repeating thereafter the circulation.

For warming (see FIG. 6)

The electromagnetic clutch 7a is cut off and the compressor 7 is stopped. The refrigeration cycle R is not used. The three-way valves 15 and 16 are switched to the heating circuit side shown in FIG. 6. Then, hot water heated by the engine 11 is pressure fed by the cooling water pump 12 and flows to the heater core 25 from the branch point (a), too, and cools airflow air. Hot water is further sent from the three-way valve 15 to each duct with the heat exchange function of the invention (indicated by reference numeral 5 in FIG. 6). After heating air-conditioning air flowing inside through the passage (t) of each airflow duct with the heat exchange function, hot water returns from the three-way valve 16 constituting another passage switching means to the engine 11 through the branch point (b) and repeats the circulation.

Next, the features of this embodiment and its effects will be described. In the embodiment, the flow passages (t) through which the heat exchange medium flows are disposed at least partially in the airflow ducts 3 to 6 and the brine flowing through the passages (t) tools or heats air flowing inside the airflow ducts 3 to 6. Consequently, the brine flowing through the passages (t) cools or heats the airflow ducts 3 to 6 per se and the heat exchange loss that has occurred in the prior art can be thus eliminated.

Because heating or cooling of air-conditioning air is done inside the ducts 3 to 6, too, instantaneous cooling/warming performance can be improved. Because cooling or heating of air conditioning air is done inside the airflow ducts 3 to 6, too, the scale of the heat exchangers 10 and 25 for cooling/heating inside the interior air conditioning unit 1 can be reduced and the car air conditioning unit 1 can, eventually, be made compact as a whole.

Each passage (t) is formed inside the air passage of each airflow duct 3 to 6 or inside the walls forming the air passage. Consequently, air flowing inside the airflow ducts 3 to 6 can be cooled or heated. Further, the passage (t) is disposed at a center or at a position inside and close to the air passage in a direction of thickness of the wall portion. Consequently, it is possible to prevent air outside the blast ducts 3 to 6 from being unnecessarily cooled or heated, and air flowing inside the blast ducts 3 to 6 can be effectively cooled or heated.

The passage (t) is formed integrally with the wall portions. According to this arrangement, the blast ducts 3 to 6 with the heat exchange function can be compactly constituted and an increase in the cost of production can be suppressed. The protuberance portions are disposed inside the air passage to increase the heat exchange area. The partition portions are disposed in the air passage to increase the heat exchange area. Each of them can improve heat exchange efficiency. The passage (t) is formed in the protuberance portions or the partition portions, too. This arrangement can further improve heat exchange efficiency.

The brine is cooled by the evaporator 10 in the refrigeration cycle R. The brine uses cooling water of the engine 11. Consequently, both cooling and heating can be made by the airflow ducts 3 to 6 with the heat exchange function by using the same construction as that of the automobile air conditioners of the prior art without disposing any specific cooling/heating means of the heat exchange medium.

The three-way valves 15 and 16 that are controlled by the controller 17 for air conditioning can switch the cooling passage through which the brine flowing through the passage (t) circulates between the evaporator 10 and the heating passage circulating with the engine 11. Consequently, heating and cooling by the airflow ducts 3 to 6 with the heat exchange function can be effectively achieved at the time of cool-down in summer and warm-up in winter in the interlocking arrangement with the mode switch operation of the interior air conditioner unit 1.

Second Embodiment

Figure 7:
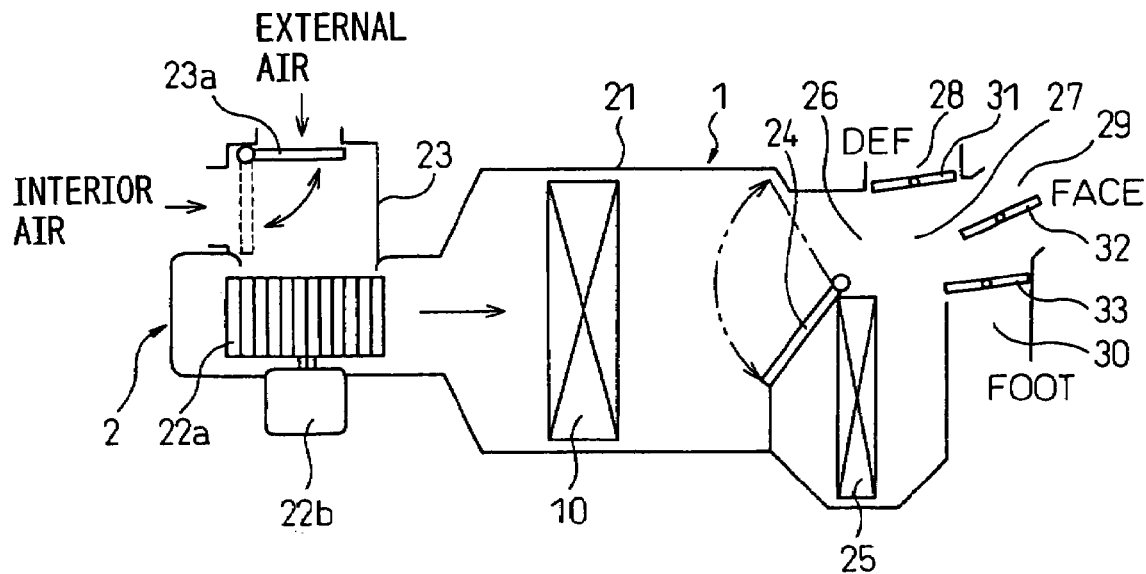
FIG. 7 is a schematic view useful for explaining a schematic construction of an interior air conditioner unit 1 according to a second embodiment of the invention.

The evaporator 10 of the heat exchanger for cooling as a part of the construction of the refrigeration cycle, not shown, of the automobile air conditioner, cools air that flows into the passenger compartment by evaporating the low pressure refrigerant after pressure reduction by the expansion valve. FIG. 7 is a schematic view useful for explaining a schematic construction of the automobile interior air conditioner unit 1 according to the second embodiment of the invention. The interior air conditioner unit 1 is generally mounted into the instrumental panel at the front part of the passenger compartment. The air conditioner case 21 of the interior air conditioner unit 1 constitutes passages of air flowing into the passenger compartment, and the evaporator 10 is arranged inside this air conditioner unit 21.

The blower 2 is arranged on the upstream side of the evaporator 10 in the air conditioner case 21 and includes the centrifugal blower fan 22a and the driving motor 22b. The interior/exterior air switch box 23 is arranged on the suction side of the blower fan 22a and the interior/exterior air switch door 23a selectively introduces external air (air outside passenger compartment) and interior air (air inside passenger compartment). The air mixing door 24 is arranged on the downstream side of the evaporator 10 inside the air conditioner case 21 and the heater core 25 for heating air with cooling water (hot water) of the engine 11 as the heat source is arranged as the heat exchanger for heating on the downstream side of this air mixing door 24.

A bypass passage 26 for causing air (cold air) to flow while bypassing the heater core 25 is formed on the side (at the upper part) of the heater core 25. The air mixing door 24 is a sheet-like door capable of rotating and regulates the proportion of the air flow of hot air passing through the heater core 25 and the air flow of cold air passing through the bypass passage 26. Therefore, the air mixing door 24 constitutes temperature adjustment means of blow-out air into the passenger compartment. Air having a desired temperature can thus be generated by mixing hot air from the heater core 25 and cold air from the bypass passage 26 by an air mixing portion 27.

A blow-out mode switch portion is formed on the downstream side of the air mixing portion 27 inside the air conditioner case 21. In other words, blow-out mode doors 31 to 33 open and close a defroster opening portion 28 for blowing out air to the inner surface of a front wind shield of the car, a face opening portion 29 for blowing out air to the upper half of a passenger inside the passenger compartment and a foot opening portion 30 for blowing off air to the feet of the passenger.

Figure 8:
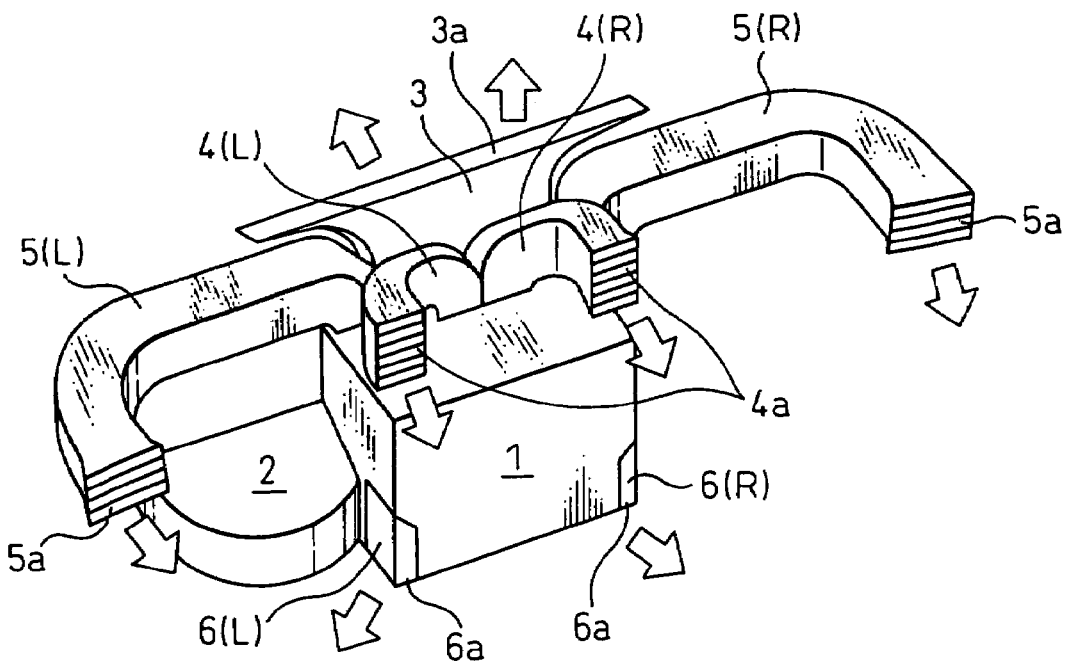
FIG. 8 is a perspective view showing a state where each of airflow ducts 3 to 6, according to the second embodiment, is fitted to the interior air conditioner unit 1.

FIG. 8 is a perspective view showing the state where each of the airflow ducts 3 to 6 according to the second embodiment is fitted to the interior air conditioner unit 1 shown in FIG. 7. The opening portions 28 to 30 of the interior air conditioner unit 1 and each of the blow-out ports 3a to 6a disposed inside, the passenger compartment communicate with one another through the airflow ducts 3 to 6 as in the gist of the invention. More concretely, the defroster opening portion 28 is connected to the defroster blow-out port 3a through the defroster airflow duct 3 and passes air to the inner surface of the front wind shield of the automobile from the defroster blow-out port 3a.

The face opening portion 29 is further divided into a center face opening portion and a side face opening portion and each of them is divided into a right side opening portion (R: for driver's seat) and a left side opening portion (L: for passenger's seat). The center face opening portion is connected to a center face blow-out port 4a arranged above the center of the instrumental panel in the transverse direction through the center face blow-out duct 4 and air is blasted from the blow-out port towards the head of the passenger at the center of the passenger compartment.

The side face opening portion is connected to side face blow-out ports 5a arranged at the upper part of both end portions of the instrumental panel through the side face blast duct 5. Each side face blow-out port 5a has a known airflow direction changing device that is operated manually. Air can be blown to the passenger face portions on both right and left sides inside the passenger compartment or towards the an air shield when an air direction plate of the air direction changing device is operated. The foot opening portion 30 is divided into the right side opening portion (R: for driver's seat) and to the left side opening portion (L: for passenger's seat), too. These opening portions are connected to the foot blow-out ports 6a through the foot airflow duct 6 and blow hot air to the feet of the right and left passengers from these blow-out ports 6a.

Signals are inputted from various sensors, not shown, to the air conditioning controller in the air conditioner for an automobile having the construction described above and control signals are sent from the air conditioning controller to the interior air conditioner unit 1, the blower 2, the electromagnetic clutch, and so forth, to control the operation.

Figure 9A:
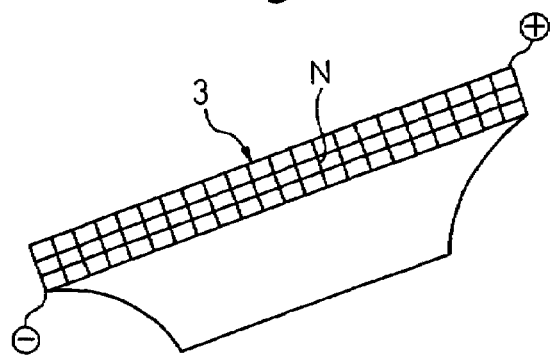
Figure 9B:
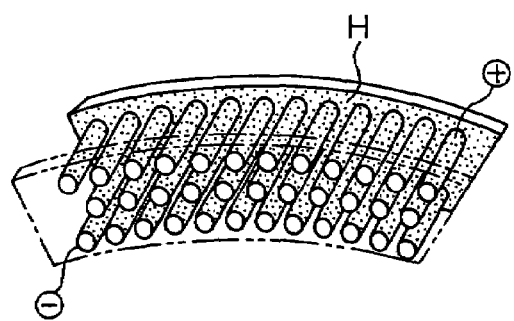
Figure 9C:
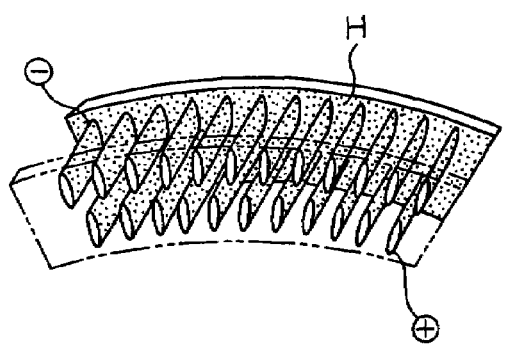
Figure 9D:
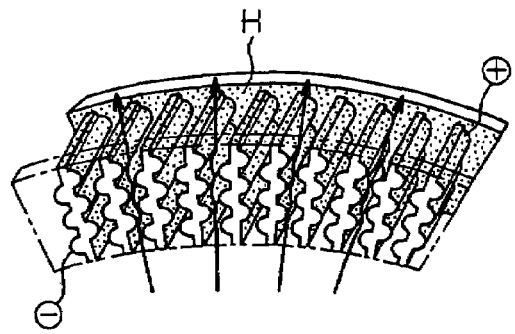

Next, the construction of the airflow duct having a heat generation film H as the gist of the second embodiment of the invention will be explained. FIGS. 9A to 9F show examples where the invention is applied to the defroster airflow duct 3. FIG. 9A is an appearance perspective view of the defroster airflow duct 3. FIGS. 9B to 9E are perspective views each showing a structural example of protuberance portions and partition portions formed inside the airflow duct 3. The airflow duct of the invention is formed of a synthetic resin material and the heat generation film H is integrally formed with at least a part of the inner surface of the air passage.

The raw material of the heat generation film H is prepared by mixing an acrylic resin, for example, with nickel (Ni) powder and adjusting a viscosity by a solvent. A uniform film material is allowed to adhere to the inner surface of the air passage by, for example, closing one of the ends of each airflow duct 3 to 6, pouring the film material from the other end, releasing the closure when the air passage is filled with the film material, and removing the excessive film material. Thereafter, the airflow duct is dried at a predetermined temperature for a predetermined time (at 80° C. for 15 minutes, for example) to form the heat generation film H. A required resistance value of the heat generation film H varies with the size of the airflow duct and with a target output. When the airflow duct has a width of 200 mm, a height of 180 mm and a depth of 27 mm and a target output of 1 KW, for example, the target resistance value is about 20 Ω/sq and the coating thickness of this film is about 50 μm.

Figure 9E:
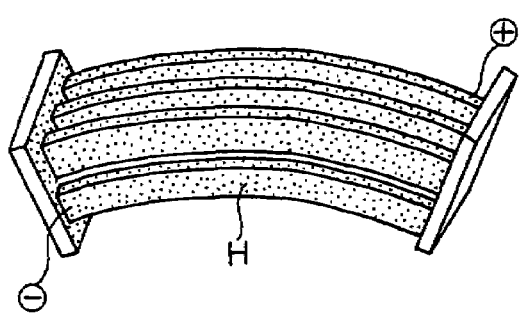

FIGS. 9A to 9E show examples of a wide and short duct such as the defroster airflow duct 3. In FIG. 9A, the film material is allowed to adhere to the air passage to form a net-like member N. Incidentally, this net-like member N may be disposed into a plurality of layers. In FIGS. 9A to 9D, the protuberance portions and the partition portions are formed not only on the inner wall of the air passage but also inside the air passage and the heat generation film H is formed on the outer surface of the protuberance portions and on both surfaces of the partition portions. These protuberance portions and partition portions are disposed or formed in such a manner that air flows in a zigzag manner through them. The partition portions may well be disposed in the longitudinal direction inside the air passage as shown in FIG. 9E.

Figure 10A:
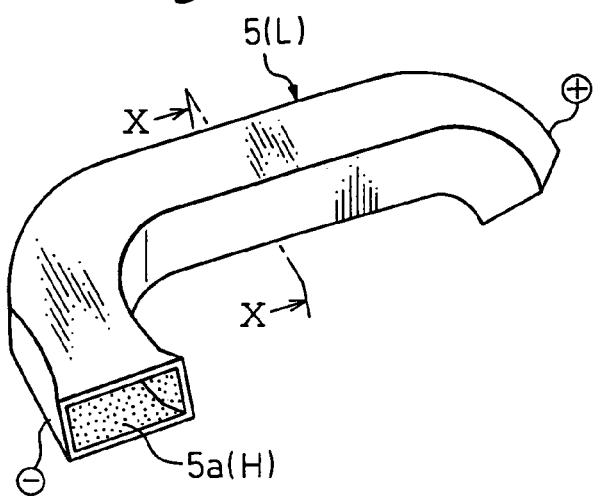
Figure 10B:
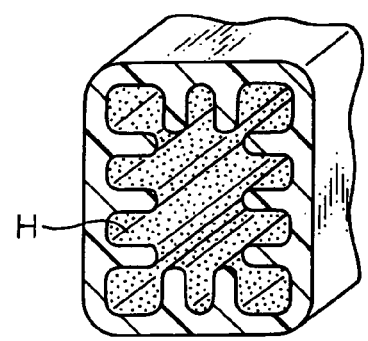

FIGS. 10A to 10E show examples of the second embodiment where the invention is applied to the side face airflow duct 5. FIG. 10A is an appearance perspective view of the side face blow-out duct 5(L) and FIGS. 10B to 10E are sectional perspective views each showing the blast duct 5 in an X-X section. The protuberance portions and the partition portions are formed not only on the inner wall of the air passage but also inside the air passage in the thinly elongated duct such as the side face airflow duct 5 as respectively shown in FIG. 10B and FIGS. 10C to 10E, and the heat generation film H is applied to the outer surface of the protuberance portions and to both surfaces of the partition portions.

Figure 10C:
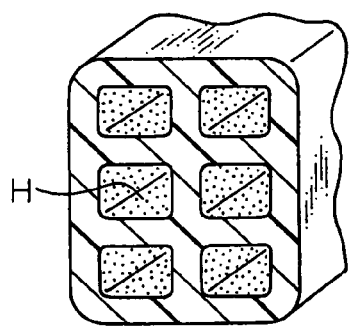
Figure 10D:
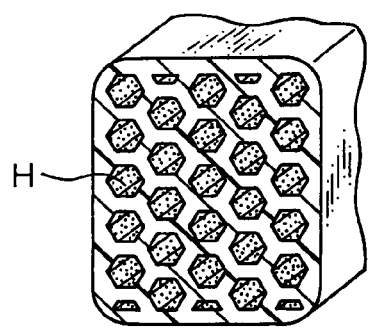
Figure 10E:
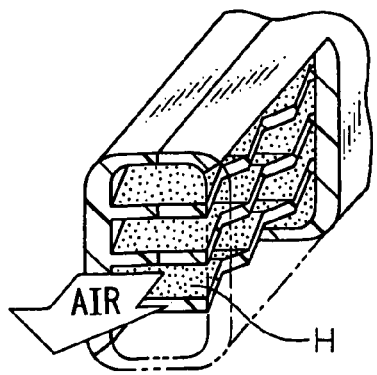

Incidentally, the partition shape of the air passage may be grid-like as shown in FIG. 10C or may be honeycomb-like as shown in FIG. 10D and is not limited to these examples. In FIG. 10E, the air passage is formed in such a manner that flowing air flows in a zigzag manner. Incidentally, similar constructions may be taken for the center face airflow duct 4 and the foot airflow duct 6, that are not explained, whenever necessary.

Next, the feature of this embodiment and its effect will be described above. First, the heat generation film H is disposed on at least a part of the inner surface of the air passage of each airflow duct 3 to 6 and this heat generation film H heats air flowing inside the airflow duct 3 to 6. In the invention, the heat generation film H is formed inside each airflow duct 3 to 6 and is allowed to generate heat by the supply of electric power so that the heat generation film H can be used as the heat source for instantaneous warming. According to this construction, a feeling of warmth (instantaneous warming) can be acquired before the cooling water of the engine is warmed. In addition, demisting and defrosting of the front wind shield and the side glass can be instantaneously started.

Even when the airflow ducts 3 to 6 are cold at this time, a loss, that hot air exchanges heat with the airflow ducts 3 to 6 and is cooled, can be eliminated. Because heating of air can be done inside the airflow ducts 3 to 6 to cope with insufficiency of the heat source resulting from the improvement of the engine, warming performance can be improved as an auxiliary heat source. Alternatively, the heat exchanger 25 for heating inside the interior air conditioner unit 1 can be made compact and the scale of the entire air conditioner unit 1 can be reduced.

The net-like member N applied with the heat generation film H is disposed inside the air passage. Consequently, air flowing inside the airflow ducts 3 to 6 can be heated. The protuberance portions for increasing the heat exchange area are disposed inside the air passage and the heat generation film H is applied to the outer surface of these protuberance portions. Further, the partition portions for increasing the heat exchange area are disposed inside the air passage and the heat generation film H is applied to both surfaces of these partition portions. The protuberance or partition portions are formed or arranged in such a manner that air flows in a zigzag manner among them. Therefore, both can improve the heat exchange efficiency.

Third Embodiment

Figure 11A:
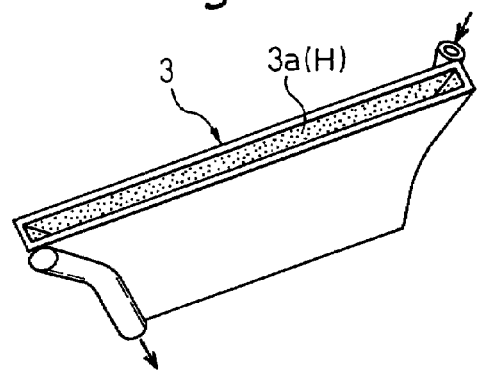

FIGS. 11A to 11F show examples where the third embodiment of the invention is applied to the defroster airflow duct 3. FIG. 11A is an appearance perspective view of the defroster airflow duct 3. FIGS. 11B to 11F are perspective views each showing a structural example of the passages (t) formed inside the airflow duct 3. The third embodiment is different from the first embodiment in that the heat generation film H is disposed on a part of the inner surface of the air passage, the air passage through which the heat exchange medium flows is disposed on a part of the inside of any one of the wall portion, the protuberance portion and the partition portion and air flowing through the airflow ducts 3 to 6 is heated by the heat exchange medium flowing through the passage (t).

Next, the construction of the airflow duct having the heat exchange function as the gist of the invention will be explained. The airflow ducts 3 to 6 of the invention are formed of a synthetic resin material and the passages (t) through which the brine (heat exchange medium) flows are integrally formed at least partially inside the airflow ducts 3 to 6. Incidentally, each passage (t) may integrally be formed by the resin or may integrally be formed by insert molding by use of flat tubes of a metal, or the like.

Figure 11B:
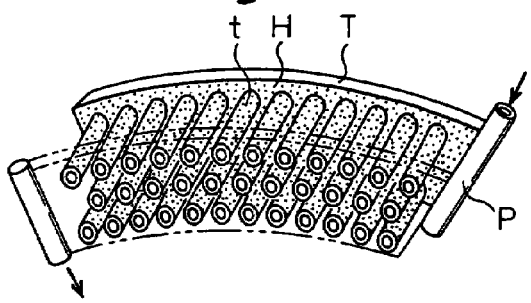

FIGS. 11A to 11F show examples of wide and short ducts such as the defroster duct 3. In FIG. 11B, a header tank portion T is formed inside both wide wall portions forming the air passages of the airflow duct 3 and a large number of tubes (t) communicating the head tank T are arranged inside the air passages to establish heat exchange with flowing air. Incidentally, symbol P in the drawing represents a header pipe for supplying the brine to the header tank portion T and recovering the brine after heat exchange from the header tank portion T.

Figure 11C:
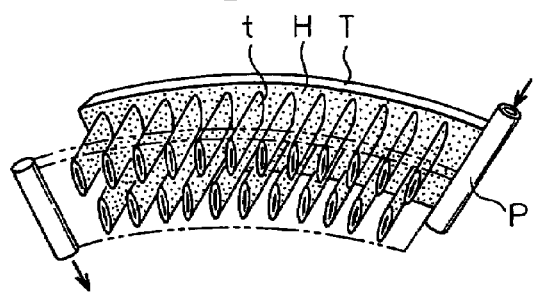
Figure 11D:
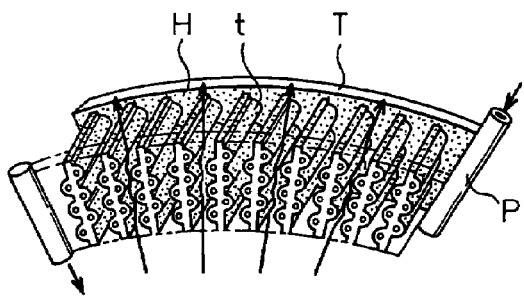
Figure 11E:
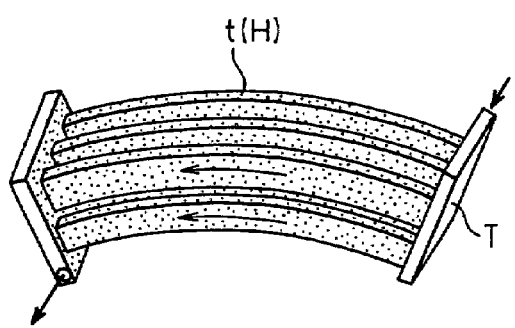
Figure 11F:
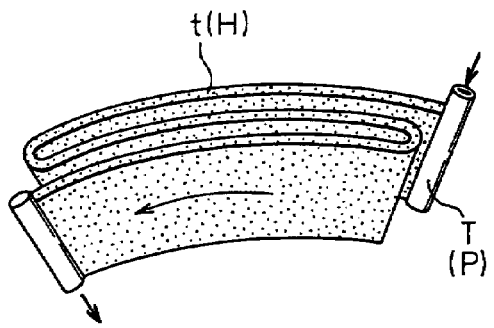

Incidentally, the tube (t) in FIG. 11B is a round tube but it may be a flat tube as shown in FIG. 11C. Alternatively, concavo-convexities may be disposed on both flat surfaces of the flat tube to form air flow passages so that air flows in a zigzag manner between them, as shown in FIG. 11D. The flat tubes may be arranged in the longitudinal direction inside the air passages as shown in FIG. 11E or a serpent type obtained by folding a flat tube as shown in FIG. 11F may be used, too.

Figure 12A:
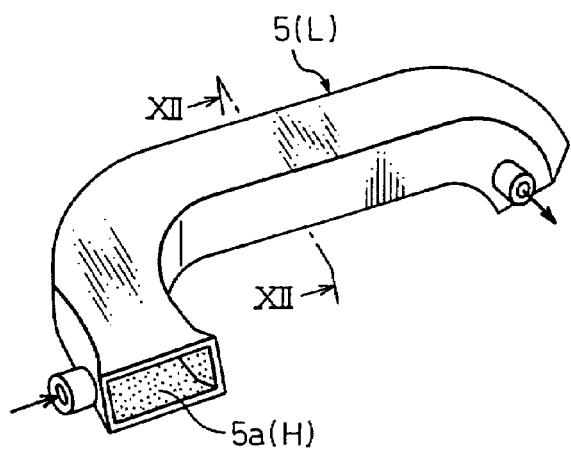
Figure 12B:
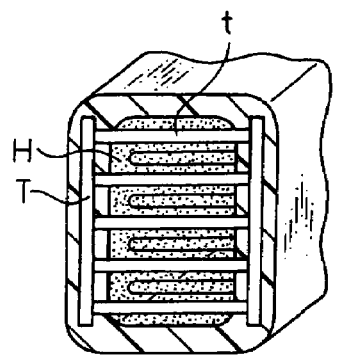

FIGS. 12A to 12G show examples where the invention is applied to the side face airflow duct 5. FIG. 12A is a perspective view of the side face blow-out duct 5(L) and FIGS. 12B to 12G are sectional perspective views each showing a structural example of passages (t) formed inside the airflow duct 5 in a XII-XII section. Referring to FIG. 12B, header tank portions T are formed inside wall portions opposing one another and forming the air passages of the airflow duct 5 in the thinly elongated duct such as the side face airflow duct 5 and a large number of tubes (t) communication among the header tank portions T are arranged inside the air passages to establish heat exchange with flowing air.

Figure 12C:
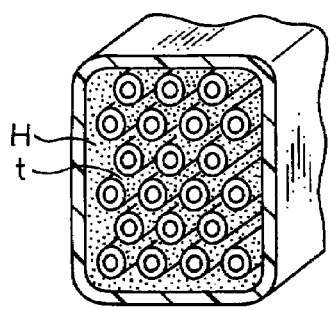
Figure 12D:
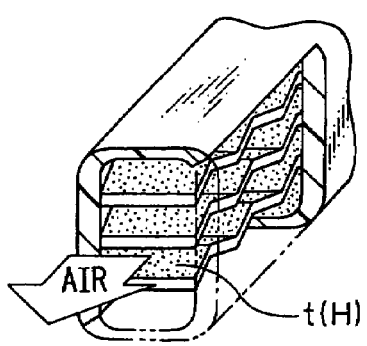

Incidentally, the tubes (t) in FIG. 12B are arranged in the direction intersecting the air passages but may be arranged in the direction of the air passages as shown in FIG. 12C or flat tubes may be used in place of the round tubes as shown in FIG. 12D. The brine flowing direction inside the flat tubes may be the direction intersecting the air passage or a direction opposing flowing air.

Figure 12E:
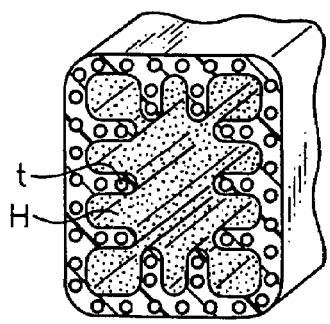
Figure 12F:
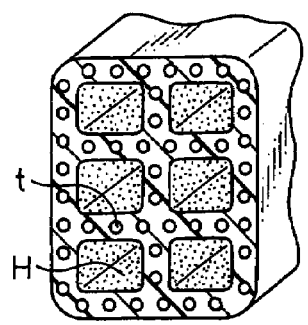
Figure 12G:
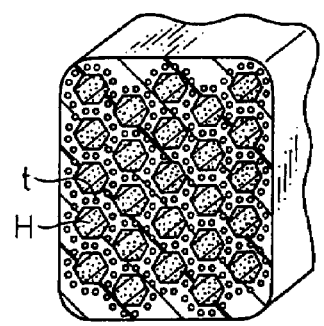

Heat medium flow holes (passages) (t) may be integrally formed inside the walls forming the air passages as shown in FIGS. 12E to 12G or protuberance portions may be disposed inside the air passages to increase the heat exchange area as shown in FIG. 12E or partition portions may be disposed as shown in FIGS. 12F and 12G. Furthermore, the heat medium passage holes (t) may be formed in the protuberance portions or in the partition portions. The partition shape of the air passages may be grid-like as shown in FIG. 12F or honeycomb-like as shown in FIG. 12G and is not particularly limited. Similar constructions may be employed, whenever necessary, for the center face airflow duct (4) and for the foot airflow duct 6 that have not been explained, too.

Next, the features of this embodiment and its effects will be described. In the embodiment, the heat generation film H is formed on a part of the inner surface of the air passage, the flow passages (t) through which the heat exchange medium flows are disposed at least partially in any of the air passages, the walls forming the air passages, the protuberance portions and the partitions, and the heat exchange medium flowing in the passages (t) heats air flowing inside the airflow ducts 3 to 6. Therefore, the heat exchange medium flowing through the passages (t) heats air flowing through the airflow ducts 3 to 6, too, and instantaneous warming performance can be further improved.

While the invention has been described by reference to specific embodiments chosen for purposes of illustration, it should be apparent that numerous modifications could be made thereto by those skilled in the art without departing from the basic concept and scope of the invention.

The invention claimed is:

1. An air conditioner for an automobile, comprising:
   an interior air conditioner unit for forming an air passage;
   a blower for introducing air inside and outside a passenger compartment into said interior air conditioner unit;
   heat exchangers each disposed inside said interior air conditioner, for exchanging heat with said air;
   opening portions of said interior air conditioner unit for blowing out heat-exchanged air;
   blow-out ports each disposed inside the passenger compartment, for blowing out said heat-exchanged air; and
   airflow ducts for connecting and communicating said opening portions and said blow-out ports; wherein
   a heat generation film (H) is formed on at least a part of an inner surface of said air passage of said airflow ducts and heats said air flowing inside said airflow ducts; and
   protuberance portions for increasing a heat exchange area are formed inside said air passage, and said heat generation film (H) is disposed on an outer surface of said protuberance portions.

2. An air conditioner for an automobile according to claim 1, wherein said protuberance portions are formed or arranged in such a manner that said air flows in a zigzag manner through them.

3. An air conditioner for an automobile, comprising:
   an interior air conditioner unit for forming an air passage;
   a blower for introducing air inside and outside a passenger compartment into said interior air conditioner unit;
   heat exchangers each disposed inside said interior air conditioner, for exchanging heat with said air;
   opening portions of said interior air conditioner unit for blowing out heat-exchanged air;
   blow-out ports each disposed inside the passenger compartment, for blowing out said heat-exchanged air; and
   airflow ducts for connecting and communicating said opening portions and said blow-out ports; wherein
   a heat generation film (H) is formed on at least a part of an inner surface of said air passage of said airflow ducts and heats said air flowing inside said airflow ducts; and
   a passage (t) through which a heat exchange medium flows is disposed inside any of wall portions forming said air passage, and said heat exchange medium flowing through said passage (t) heats said air flowing through said airflow duct.

4. An air conditioner for an automobile according to claim 1, wherein a passage (t) through which a heat exchange medium flows is disposed inside said protuberance portions, said heat exchange medium flowing through said passage (t) heats said air flowing through said airflow duct.

5. An air conditioner for an automobile, comprising:
   an interior air conditioner unit for forming an air passage;
   a blower for introducing air inside and outside a passenger compartment into said interior air conditioner unit;

heat exchangers each disposed inside said interior air conditioner, for exchanging heat with said air;

opening portions of said interior air conditioner unit for blowing out heat-exchanged air;

blow-out ports each disposed inside the passenger compartment, for blowing out said heat-exchanged air; and airflow ducts for connecting and communicating said opening portions and said blow-out ports; wherein a heat generation film (H) is formed on at least a part of an inner surface of said air passage of said airflow ducts and heats said air flowing inside said airflow ducts; and partition portions for increasing a heat exchange area are formed inside said air passage, and said heat generation film (H) is disposed on both surfaces of said partition portion; and a passage (t) through which a heat exchange medium flows is disposed inside said partition portions, said heat exchange medium flowing through said passage (t) heats said air flowing through said airflow duct.

* * * * *